United States Patent [19]

Barker

[11] Patent Number: 5,060,532
[45] Date of Patent: Oct. 29, 1991

[54] UNIVERSAL JOINT BOOM

[76] Inventor: Sidney L. Barker, 4301 Hudson La., Tampa, Fla. 33624

[21] Appl. No.: 571,293

[22] Filed: Aug. 23, 1990

[51] Int. Cl.⁵ .............................................. B25J 18/02
[52] U.S. Cl. ........................................ 74/479; 901/15; 901/18
[58] Field of Search ...................... 74/479; 901/15, 18, 901/22

[56] References Cited

U.S. PATENT DOCUMENTS

| 4,762,459 | 8/1988 | Morita | 901/22 X |
| 4,801,239 | 1/1989 | Austad | 901/22 X |

FOREIGN PATENT DOCUMENTS

| 2000013 | 10/1979 | Fed. Rep. of Germany | 901/18 |
| 428932 | 1/1975 | U.S.S.R. | 901/15 |
| 738863 | 6/1980 | U.S.S.R. | 901/15 |
| 768630 | 11/1980 | U.S.S.R. | 901/15 |

Primary Examiner—Leslie A. Braun
Assistant Examiner—Scott Anchell
Attorney, Agent, or Firm—Dominik, Stein, Saccocio Reese, Colitz & Van Der Wall

[57] ABSTRACT

A universal joint boom assembly comprising two boom segments having paired eared ends connected end to end by means of a universal joint with one of its set of ears parallel to an X axis and the other set of ears parallel to a Y axis which is perpendicular to the X axis. An offset X axis hydraulic assembly and an offset Y axis hydraulic assembly interconnects the boom segments to cause pivoting of the boom universal joint so as to lean a boom segment in the direction of the X and Y axes respectively.

15 Claims, 5 Drawing Sheets

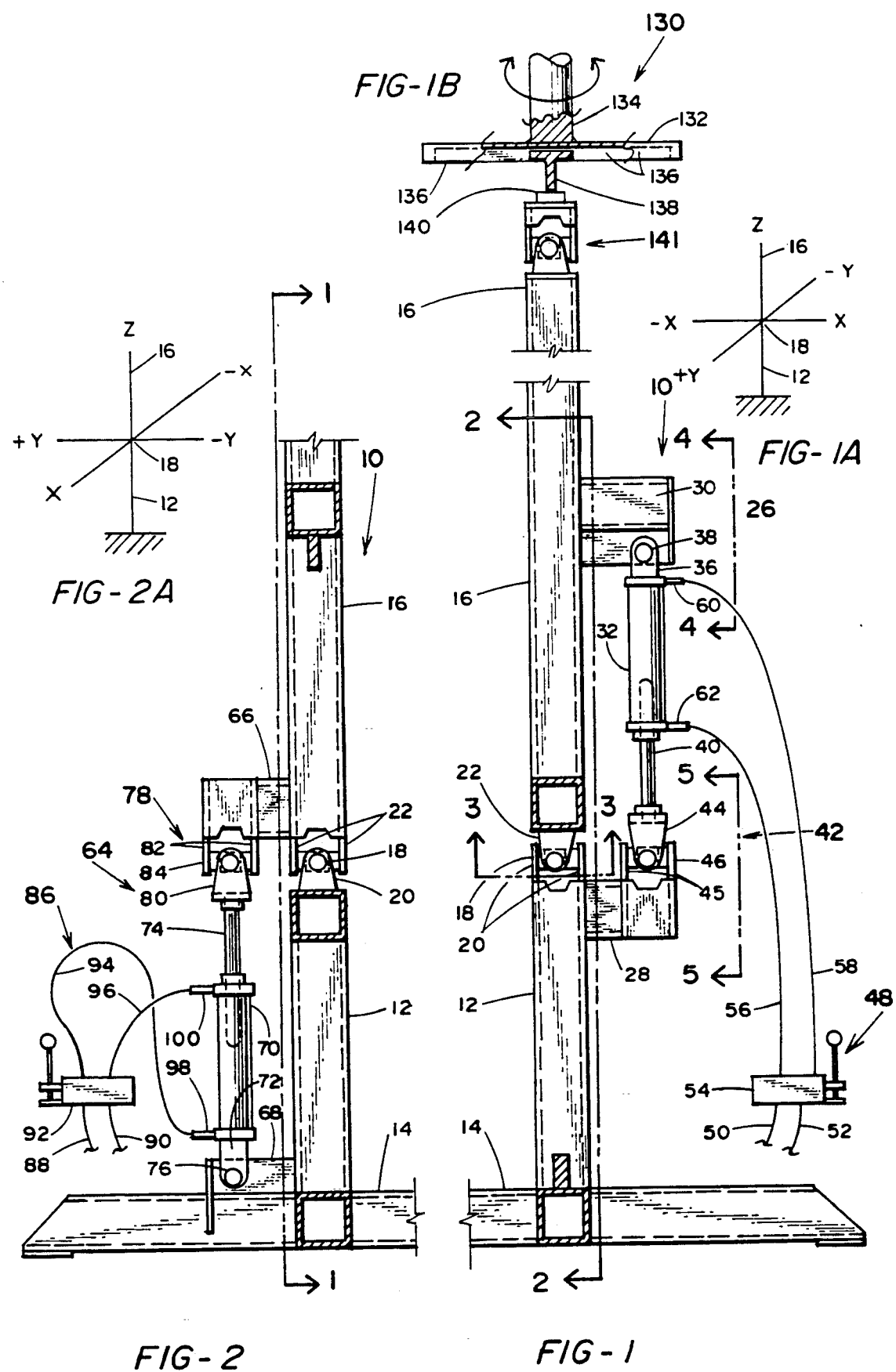

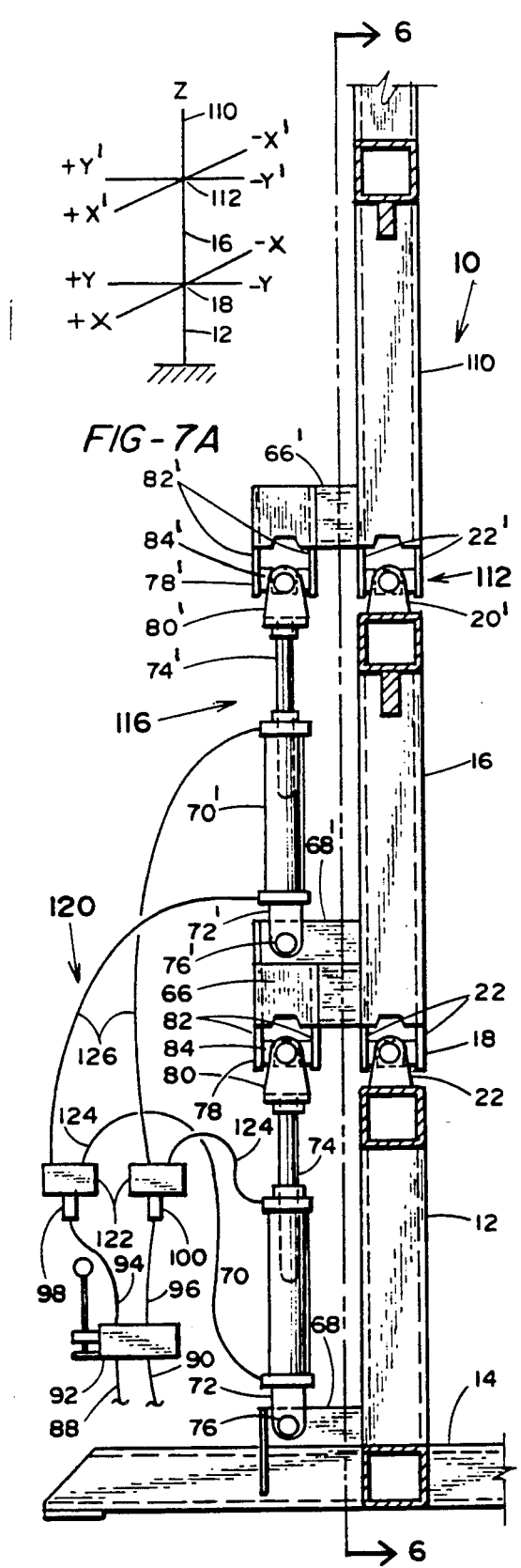
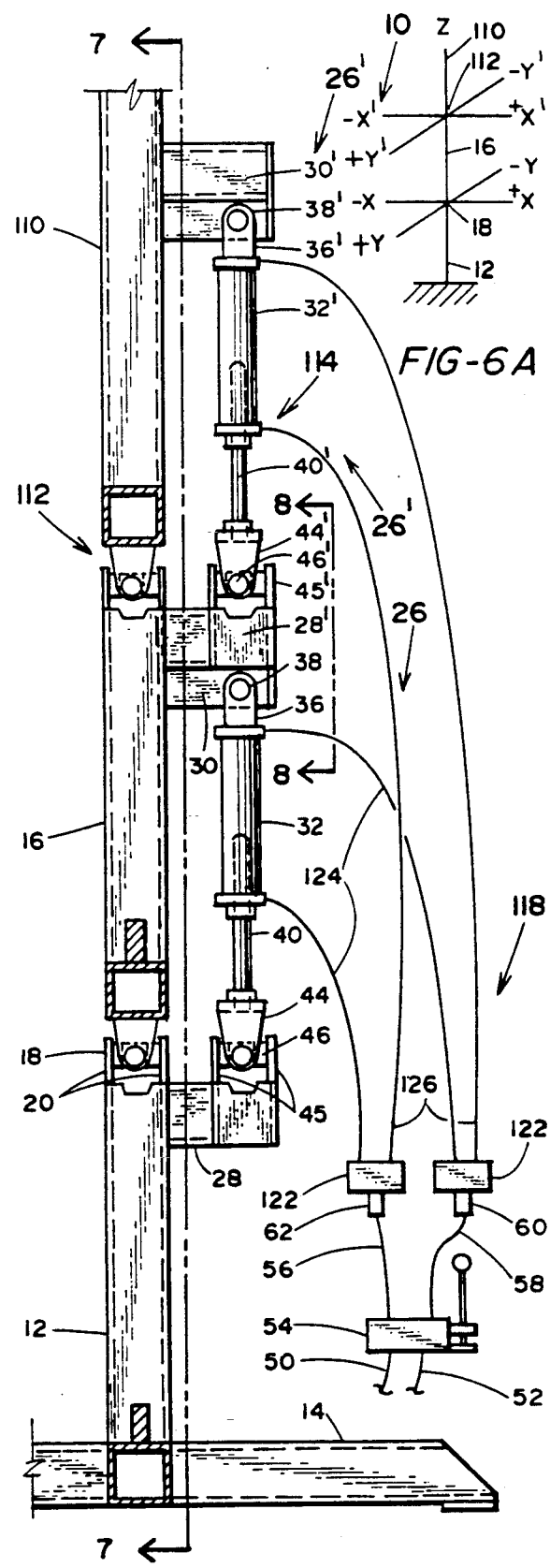
FIG-7
FIG-6

5,060,532

UNIVERSAL JOINT BOOM

BACKGROUND OF THE INVENTION

1. Field of the Invention

This invention relates to articulated boom assemblies. More particularly, this invention relates to articulated boom assemblies comprising two or more boom segments interconnected end to end by means of universal joints and articulated by means of hydraulic cylinders operatively connected to adjacent boom segments.

2. Description of the Background Art

Presently, there exists many types of articulative or robotic arms designed to reach or lean in all directions. As illustrated in U.S. Pat. Nos. 4,353,677, 4,480,495, 4,568,311 and 4,708,578, a prevalent type of robotic arm employs various gearing which allows pivotable and rotational interconnection of the boom segments.

Another common type of robotic arm comprises boom segments which are interconnected by pivotable or universal joints powered by interconnecting cables or hydraulic cylinders. Such arrangements are illustrated in U.S. Pat. Nos. 3,160,290, 3,497,083, 3,792,782, 4,024,961, 4,107,948, 4,300,362, 4,566,843, 4,712,969, and 4,724,716, U.S.S.R. Patent No. 422,580 and UK Patent No. 1,148,365.

An object of this invention provides an improvement which is a significant contribution to the advancement of the boom assembly art.

Another object of this invention is to provide a boom assembly comprising a first boom segment having an end with paired ears; a second boom segment having an end with paired ears pivotably connected to the paired ears of the end of the first boom segment by means of a spider of a boom universal joint; an X axis extensible assembly for leaning the second boom segment in the direction of the X axis, the assembly comprising an extensible means having two ends each with paired ears, the paired ears of one the end being pivotably connected to paired ears of first offset bracket by means of a spider of a universal joint and the paired ears of the other end being pivotably connected to paired ears of a second offset bracket, the first offset bracket being connected to the end of the first boom segment and the second offset bracket being connected to the second boom segment, the paired ears of the ends of the extensible assembly being parallel to the paired ears of the second boom segment; and a Y axis first extensible assembly comprising an extensible means having two ends each with paired ears, the paired ears of one end being pivotably connected to paired ears of a first offset bracket and the paired ears of the other end being pivotably connected to paired ears of a second offset bracket by means of a spider of a universal joint, the first offset bracket being connected to the second boom segment and the second offset bracket being connected to the end of the first boom segment, the paired ears of the ends of the extensible assembly being parallel to the paired ears of the first boom segment; whereby, extension or contraction of the X axis extensible means leans the second boom segment toward the X axis and whereby, extension or contraction of the Y axis extensible means leans the second boom segment toward the Y axis.

Another object of this invention is to provide a boom assembly as set forth above, wherein the boom universal joint and universal joints of the extensible assemblies lie in a plane perpendicular to the boom segments when the boom segments are colinearly aligned.

Another object of this invention is to provide a boom assembly as set forth above, further including an X axis control system for controlling the extension or contraction of the X axis extensible means.

Another object of this invention is to provide a boom assembly as set forth above, further including a Y axis control system for controlling the extension or contraction of the Y axis extensible means.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a universal joint boom assembly comprising two boom segments having paired eared ends connected end to end by means of a universal joint with one of its set of ears parallel to an X axis and the other set of ears parallel to a Y axis which is perpendicular to the X axis. An offset X axis hydraulic assembly and an offset Y axis hydraulic assembly interconnects the boom segments to cause pivoting of the boom universal joint so as to lean a boom segment in the direction of the X and Y axes respectively.

The X axis hydraulic assembly comprises an X axis hydraulic cylinder having its paired eared ends connected between a bracket extending from an upper end of the first boom by means of an offset universal joint and having its base pivotably connected to a bracket extending from an upper portion of the second boom segment by a single pin connection. Similarly, the Y axis hydraulic assembly comprises a Y axis hydraulic cylinder having its paired eared ends connected between a bracket extending from a lower end of the second boom segment by means of an offset universal joint and a bracket extending from a lower portion of the first boom segment by a simple pin connection. An X axis control system and a Y axis control system are provided for causing the extensible rods of the X axis and Y axis hydraulic cylinders to contract or extend.

It has been found that for uniform movement the paired ears at each end of each hydraulic cylinder must be parallel with the paired ears of the boom segment to which the opposite end (simple pin connected end) of that hydraulic cylinder is connected which requires that the X and Y axis hydraulic cylinders be inverted relative each other. Furthermore, it has been found that the offset universal joints and the boom universal joint must be positioned in a plane that is perpendicular to the boom segments when the boom segments are aligned.

Without departing from the spirit and scope of this invention, the boom assembly may further comprise additional boom segments interconnected end to end by similar boom universal joints and pivoted by similarly constructed X axis and Y axes hydraulic assemblies.

Important features of the boom assembly of the invention are the positioning of the boom universal joint in alignment with the offset universal joints as described above and positioning of the universal joint of the X axis hydraulic cylinder inverted relative to the universal joint of the Y axis hydraulic cylinder. Specifically, if the hydraulic cylinders were not inverted relative to each other, the hydraulic cylinders would have to be connected to their respective brackets by means of universal joints at both ends. This would create torque in the boom when subjected to crane-type loads, would cause non-uniform boom motion, would reduce the reach or lean and would make the boom assembly practically useless for any high speed applications. Likewise, if the paired ears of the boom universal joint and the paired ears of the offset universal joints were not aligned as described above, the hydraulic cylinders would rotate significantly between their end connections when leaning from the aligned position when the 90° axis is not aligned and would result in non-uniform movements.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying dr in which:

FIG. 1 a front elevational view of a two segment boom assembly in the aligned, vertical position, partially in lines 1—1 of FIG. 2;

FIG. 2 is a side elevational view of the two segment boom assembly, partially in section along lines 2—2 of FIG. 1.

FIG. 6 is a front elevational view of a three segment assemble boom partially in section along lines 6—6 of FIG. 7;

FIG. 7 is a side elevational view of the three segment boom assembly, partially in section along lines 7—7 of FIG. 6;

Similar reference characters refer to similar parts throughout the several views of the drawings.

DETAILED DESCRIPTION OF THE PREFERRED EMBODIMENT

Figure 3:
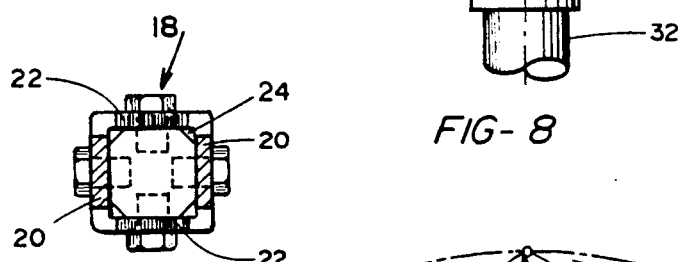
FIG. 3 is a cross-sectional view of FIG. 1 along lines 3—3 illustrate the spider of the boom universal joint.

As shown in FIGS. 1 and 2, the boom assembly 10 of the invention comprises a first boom segment 12 rigidly connected at its lower end to a base 14 and a second boom segment 16 pivotably connected at its lower end to the upper end of the first boom segment 12 by means of a boom universal joint 18. As shown in FIG. 3, boom universal joint 18 comprises a pair of parallel ears 20 extending upwardly from the upper end of the first boom segment 12 and a pair of parallel ears 22 extending downwardly from the lower end of the second boom segment 16; the paired ears 20 and 22 being interconnected by a universal joint spider 24 as is conventional in the art (see FIG. 3). As shown in FIGS. 1A and 2A, boom universal joint 18 allows pivoting of the second boom segment 16 relative to the first boom segment 12 toward the X and Y axes centered with the universal joint 18.

Figures 4, 5, 8:
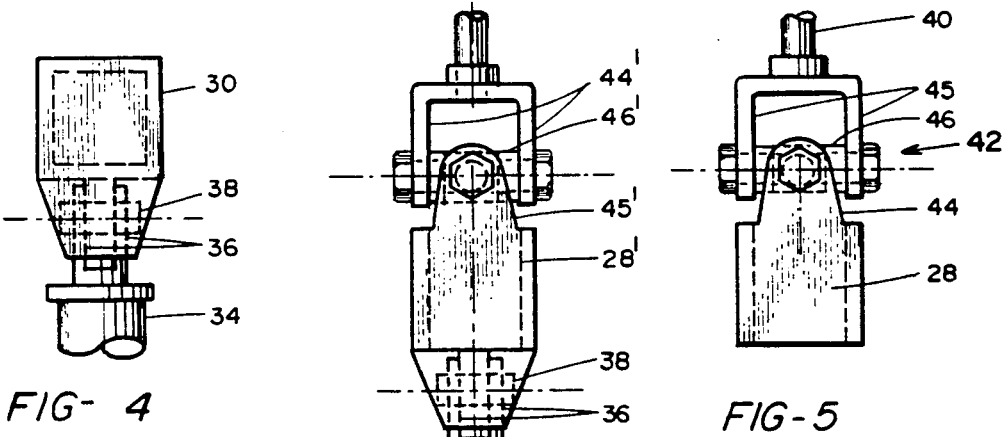
FIG. 4 is a partial right side view of FIG. 1 along lines 4—4 of FIG. 1 illustrating the offset pivot joint.
FIG. 5 is a partial right side view of FIG. 1 along lines 5—5 of FIG. 1 illustrating the offset universal joint.
FIG. 8 is a partial side view of FIG. 6 along lines 8—8 illustrating the abutting pivot joint of the lower X axis hydraulic cylinder and the universal joint of the upper X axis hydraulic cylinder.

Pivoting toward the X axis is accomplished by means of an X axis hydraulic assembly generally indicated by numeral 26. Specifically, the X axis hydraulic assembly 26 comprises a first bracket 28 which is rigidly connected to the upper end of the first boom segment 12, a second bracket 30 rigidly connected to an upper portion of the second boom segment 16 and an X axis hydraulic cylinder 32 operatively connected therebetween. As shown in FIG. 4, the base end 34 of the X axis hydraulic cylinder 32 is provided with a pair of ears 36 which are pivotably connected to the second bracket 30 by means of pivot pin 38. As shown in FIG. 5, the end of the extensible rod 40 of the hydraulic cylinder 32 is connected to the first bracket 28 by means of a universal joint 42 comprising a pair of parallel ears 45 extending from the end of the extensible rod 40 and a pair of parallel ears 44 extending from the first bracket 28 interconnected by a conventional universal joint spider 46.

The universal joint 42 is aligned with the boom universal joint 18, but positioned offset (via bracket 28) such that a line passing through the offset universal joint 42 and the boom universal joint 18 is perpendicular to the axis of the first boom segment 12 to which the offset universal joint 42 is connected. The paired ears 20 of the first boom segment 12 are positioned parallel to the paired ears 45 of the first bracket 28. Likewise, the paired ears 22 of the second boom segment 16, the paired ears 44 of the extensible rod 40 of the hydraulic cylinder 32, and the paired ears 36 of the base 34 of the hydraulic cylinder 32 are positioned parallel to each other.

An X axis control system, generally indicated by numeral 48, is provided for controlling the operation of the X axis hydraulic cylinder 32. Preferably, the X axis control system 48 comprises hydraulic supply and return lines 50 and 52 from a hydraulic pump (not shown) to a four way control valve 54. Two alternating hydraulic supply and return lines 56 and 58 are connected to return flow control valves 60 and 62 which are connected to opposite ends of the X axis hydraulic cylinder 32.

As best shown in FIGS. 2 and 2A, pivoting toward the Y axis is accomplished by means of an Y axis hydraulic assembly, generally indicated by numeral 64, which is similar in structure to the X axis hydraulic assembly 26 but inverted and positioned at 90° from the X axis hydraulic assembly 26. Specifically, the Y axis hydraulic assembly 64 comprises a first bracket 66 which is rigidly connected to the lower end of the second boom segment 16, a second bracket 68 rigidly connected to a lower portion of the first boom segment 12 and a Y axis hydraulic cylinder 70 operatively connected therebetween. The base end of the Y axis hydraulic cylinder 70 is provided with a pair of ears 72 which are pivotably connected to the second bracket 68 by means of pivot pin 76. The end of the extensible rod 74 of the Y axis hydraulic cylinder 70 is connected to the first bracket 66 by means of a universal joint 78 comprising a pair of ears 80 extending from the end of the extensible rod 74 and a pair of ears 82 extending from the first bracket 66 interconnected by a conventional universal joint spider 84.

The universal joint 78 is aligned with the boom universal joint 18, but positioned offset (via bracket 66) such that a line passing through the offset universal joint 78 and the boom universal joint 18 is perpendicular to the axis of the second boom segment 16 to which the offset universal joint 78 is connected. The paired ears 20 of the first boom segment 12 are positioned parallel to the paired ears 72 of the second bracket 68 and the paired ears 80 of the extensible rod 74 of the hydraulic cylinder 70. Likewise, the paired ears 22 of the second boom segment 16 are positioned parallel to the paired ears 82 of bracket 66.

A Y axis control system, generally indicated by numeral 86, is provided for controlling the operation of the Y axis hydraulic cylinder 70. Preferably, the Y axis control system 86 comprises hydraulic supply and return lines 88 and 90 from a hydraulic pump (not shown) to a four way control valve 92. Two alternating hydraulic supply and return lines 94 and 96 connected to return flow control valves 98 and 100 are connected to opposite ends of the Y axis hydraulic cylinder 70.

The boom assembly 10 may comprise two or more interconnected boom segments driven by respective X and Y axis hydraulic assemblies without departing from the spirit and scope of this invention. For example, as shown in FIGS. 6, 6A, 7 and 7A, the boom assembly 10 of the invention may comprise a third boom segment 110 having its lower end connected to the upper end of the second boom segment 16 by means of a third boom universal joint, generally indicated by numeral 112, which allows pivoting toward X' and Y' axes positioned above the X and Y axes of the first boom universal joint 18. An X' axis hydraulic assembly 114 and a Y' axis hydraulic assembly 116 are provided for causing pivoting toward the X' and Y' axis, respectively, and are identical in structure to the X axis and Y axis hydraulic assemblies 26 and 64, respectively, described hereinabove. Hence, the primed reference numerals referring to components of the second boom universal joint 112 and the X' and Y' axis hydraulic assemblies 114 and 116 correspond to the non-primed referenced numerals referring to the components of the first boom universal joint 18 and the X and Y axis hydraulic assemblies 26 and 64 described hereinabove. FIG. 8 illustrates the abutting brackets 30 and 28'.

The X' axis hydraulic assembly 114 and the Y' axis hydraulic assembly 116 are controlled by an X' axis control system 118 and a Y' axis control system 120 similar in construction to the respective X axis control system 48 and the Y axis control system 64, but with the inclusion of a hydraulic flow dividers 122 which comprises an inline hydraulic motor and two hydraulic pumps arranged to deliver equal flow rates to separate circuits 124 and 126 regardless of the pressure in the circuits such that the two X and X' axis hydraulic cylinders 32 and 32' are moved in the same amount and in the same direction and such that the Y and Y' hydraulic cylinders 70 and 70' move in the same amount and in the same direction.

Figure 11:
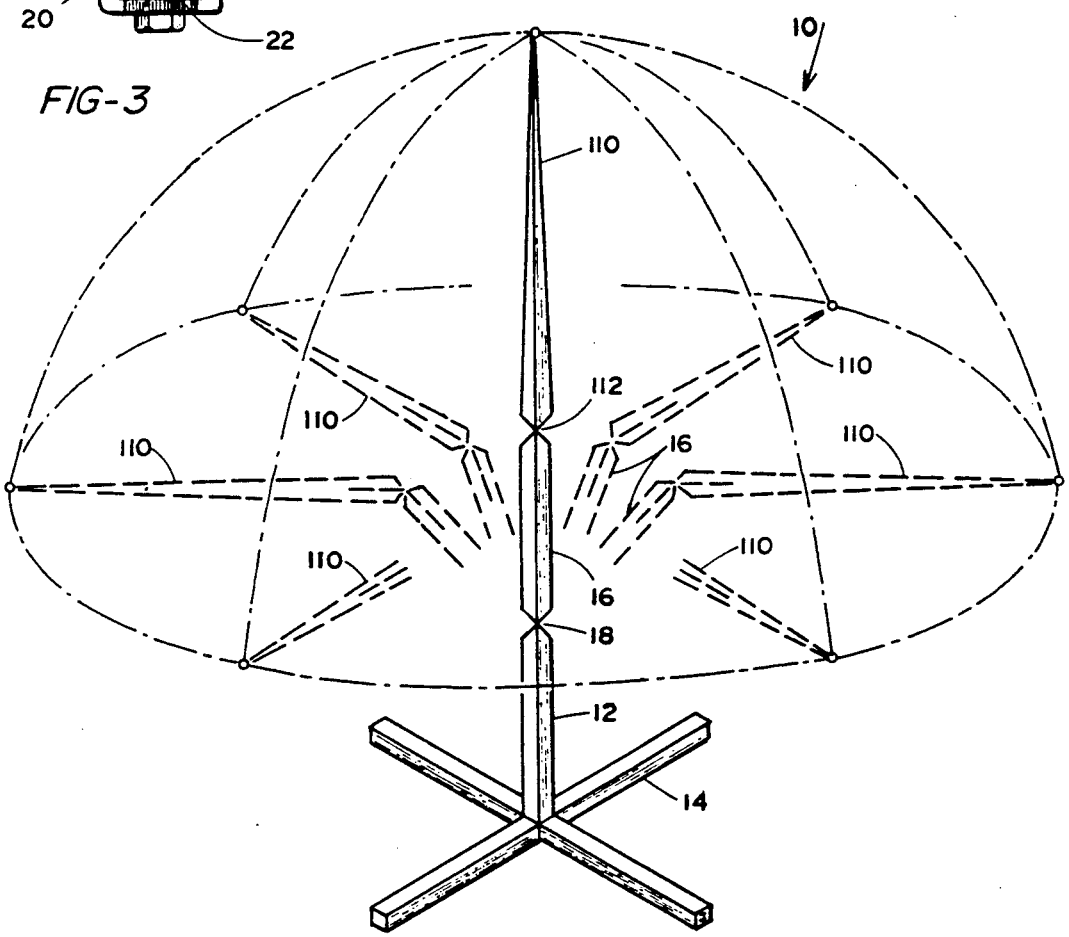
FIG. 11 a schematic view of the boom assembly illustrating its 90° reach in all X and Y directions from the vertical Z axis.
Figure 9:
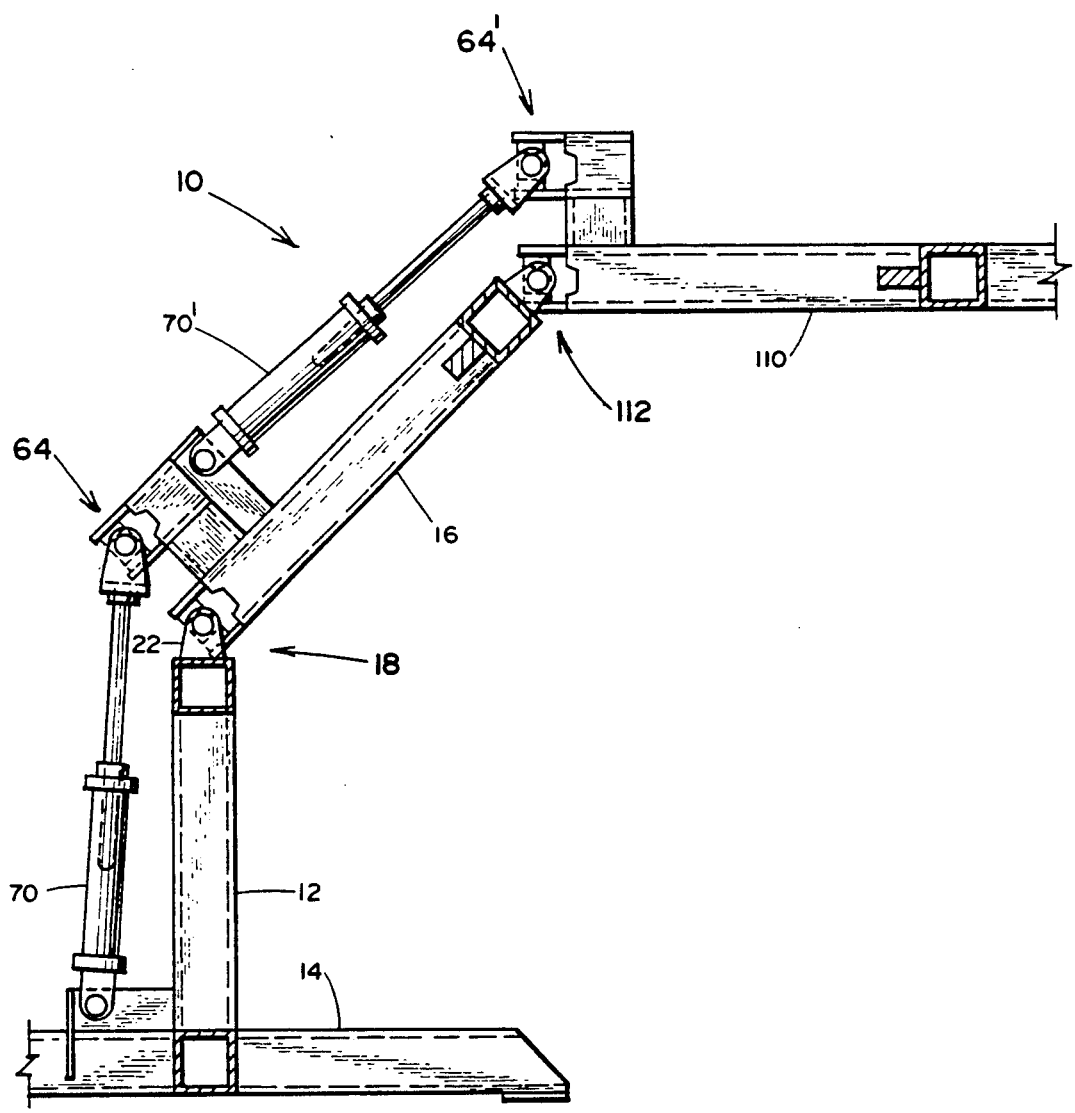
FIG. 9 is a side elevational view of FIG. 6 similar to FIG. 7, but with the Y axis hydraulic cylinders fully extended such that the boom assembly reaches 90° in the −Y axis direction.
Figure 10:
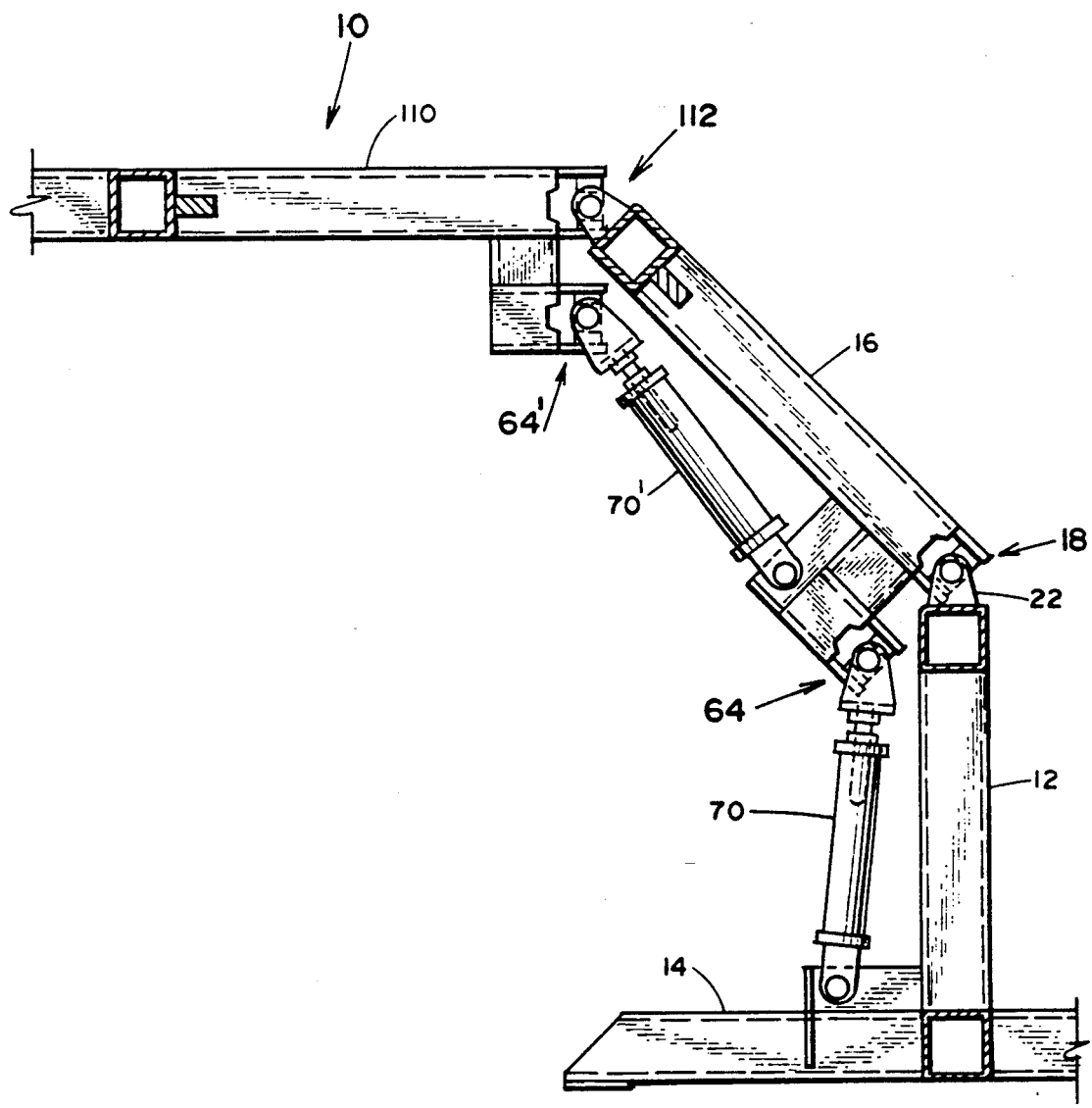
FIG. 10 is a side elevational view of FIG. 6 similar to FIG. 7, but with the Y axis hydraulic cylinders fully contracted such that the boom assembly reaches 90° in the +Y direction.

During operation, extension of the hydraulic cylinders 32 and 32' and 70 and 70' cause the boom segments 12, 16 and 110 to pivot about the respective boom universal joints 18 and 112 in the desired direction. For example, as shown in FIGS. 9 and 10, full extension of the Y and Y' hydraulic cylinders 70 and 70' causes pivoting of the second and third boom segments 16 and 110 by 45° toward the Y and Y' axes such that the axis of the third boom segment 110 is positioned parallel to the Y axis and in the +Y direction. Likewise, as shown in FIG. 10, full contraction of the Y and Y' hydraulic cylinders 70 and 70' causes pivoting of the second and third boom segments 16 and 110 by 45° toward the −Y and −Y' axes such that the axis of the third boom segment 110 is positioned parallel to the Y axis in the −Y direction. Concurrent operation of the X and X' hydraulic cylinders 32 and 43' therefore results in a semi-hemispherical range of motion as shown in FIG. 11.

It should be realized that the above described locations of the rods 40 and 74 and bases of the cylinders 32 and 70 may be reversed if the described end connections were not reversed.

Referring to FIG. 1B, the boom assembly 10 of the invention may be configured to produce rotary motion. More specifically, a rotary motion assembly 130 may comprise a rotatable disk 132 rigidly welded to the end of a rotatable shaft 134. A slot 136 extends diametrically through the bottom surface of the disk 132. A T-shaped, non-splined telescopic pin 138 is slidably positioned within slot 136. The round lower end of the pin 138 extends into bearing 140 which allows said pin to freely rotate and slide vertically and said bearing is rigidly connected to said universal joint, generally indicated by numeral 141, connected to the upper end of the second boom segment 16.

During use, positioning of pin 138 in either direction in slot 136 will cause rotation of shaft 134 as the X and Y hydraulic cylinder assemblies 26 and 64 are simultaneously operated. Hydraulic cylinder controls capable of causing the top of boom segment 16 to move in a circle of any desired diameter would make this a variable displacement motor.

Conversely, hydraulic cylinders 26 and 64 may function as hydraulic pumps by rotating shaft 134 with pin 138 extended in one direction within slot 136. In this manner, during rotation of shaft 134, hydraulic cylinders 32 and 70 are pumped. Controls capable of positioning pin 138 at any desired offset position would make this a variable displacement pump.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A boom assembly, comprising in combination:
   a first boom segment having an end with paired ears;
   a second boom segment having an end with paired ears pivotably connected to said paired ears of said end of said first boom segment by means of a spider of a boom universal joint, said paired ears of said boom segments defining +X and −X axes perpendicular to +Y and −Y axes;
   an X axis extensible assembly for pivoting said second boom segment about the Y axis in the direction of the +X and −X axes, said X axis extensible assembly comprising an X axis extensible means having two ends each with paired ears, said paired ears of one said end being pivotably connected to a first X axis offset bracket by means of a spider of an X axis universal joint and said paired ears of said other end being pivotably connected to paired ears of a second X axis offset bracket, said first X axis offset bracket being connected to said end of said first boom segment and said second X axis offset bracket being connected to said second boom segment, said paired ears of said ends of said X axis extensible assembly being parallel to said paired ears of said second boom segment; and
   a Y axis extensible assembly for pivoting said second boom segment about the X axis in the direction of the +Y and −Y axes, said Y axis extensible assembly comprising a Y axis extensible means having two ends each with paired ears, said paired ears of said one end being pivotably connected to a first Y axis offset bracket and said paired ears of said other end being pivotably connected to paired ears of a second Y axis offset bracket by means of a spider of a Y axis universal joint, said first Y axis offset bracket being connected to said first boom segment and said second Y axis offset bracket being connected to said end of said second boom segment, said paired ears of said ends of said Y axis extensible assembly being parallel to said paired ears of said first boom segment.
   whereby, extension or contraction of said X axis extensible means pivots said second boom segment toward said X axis and whereby, extension or contraction of said Y axis extensible means pivots said second boom segment toward said Y axis.

2. The boom assembly as set forth in claim 1, wherein said boom universal joint and said offset universal joints lie in a plane that is perpendicular to said boom segments when said boom segments are collinear.

3. The boom assembly as set forth in claim 1, further including an X axis control system for controlling the extension or contraction of said X axis extensible means.

4. The boom assembly as set forth in claim 1, further including an Y axis control system for controlling the extension or contraction of said Y axis extensible means.

5. The boom assembly as set forth in claim 1, wherein said X axis extensible means comprises an X axis hydraulic cylinder having an extensible rod, wherein said one end of said X axis extensible means comprises an end of said extensible rod and wherein said other end of said X axis extensible means comprises a base end of said hydraulic cylinder.

6. The boom assembly as set forth in claim 1, wherein said Y axis extensible means comprises a Y axis hydraulic cylinder having an extensible rod, wherein said one end of said Y axis extensible means comprises an end of said extensible rod and wherein said other end of said Y axis extensible means comprises a base end of said hydraulic cylinder.

7. The boom assembly as set forth in claim 1, further comprising a third boom segment having an end with paired ears pivotably connected to another end of said second boom segment having paired ears by means of a spider of a second boom universal joint, said paired ears of said second and third boom segments defining +X′ and −X′ axes perpendicular to +Y′ and −Y′ axes;
   an X′ axis extensible assembly for pivoting said third boom segment about the Y′ axis in the direction of the, +X and −X axes, said X′ axis extensible assembly comprising an X′ axis extensible means having two ends each with paired ears, said paired ears of one said end being pivotably connected to paired ears of a first X′ axis offset bracket by means of a spider of an X′ axis universal joint and said paired ears of said other end being pivotably connected to a second X′ axis offset bracket, said first X′ axis offset bracket being connected to said end of said second boom segment and said second X′ axis offset bracket being connected to said third boom segment, said paired ears of said ends of said X′ axis extensible assembly being parallel to said paired ears of said third boom segment; and
   a Y° axis extensible assembly for pivoting said third boom segment about the X′ axis in the direction of the, +Y′ and −Y′ axes, said Y axis extensible assembly comprising a Y′ axis extensible means having two ends each with paired ears, said paired ears of one said end being pivotably connected to paired ears of a first Y′ axis offset bracket means of a spider of a Y′ axis universal joint and said paired ears of said other end being pivotably connected to a second Y′ bracket, said first Y′ axis offset bracket being connected to said end of said third boom segment and said second Y′ axis offset bracket being connected to said second boom segment, said paired ears of said ends of said Y′ axis extensible assembly being parallel to said paired ears of said second boom segment.

8. The boom assembly as set forth in claim 7, further including an X axis control system for controlling the extension or contraction of both said X and X′ axis extensible means.

9. The boom assembly as set forth in claim 7, further including an Y axis control system for controlling the extension or contraction of both said Y and Y′ axis extensible means.

10. The boom assembly as set forth in claim 8, wherein said X axis control system causes extension or contraction of both said X and X′ axes extensible means to move simultaneously at the same rate.

11. The boom assembly as set forth in claim 9, wherein said Y axis control system causes extension or contraction of both said Y and Y axes extensible means to move simultaneously at the same rate.

12. The boom assembly as set forth in claim 1, wherein said boom universal joint and said offset universal joints lie in a plane that is perpendicular to said boom segments when said boom segments are collinear.

13. The boom assembly as set forth in claim 1, further including means for producing rotary motion.

14. The boom assembly as set forth in claim 13, wherein said means for producing rotary motion comprises a pin rotatably and extensibly movable in a bearing connected to an end of said second boom segment by means of a universal joint, said pin being movable within a radial slot in a rotatably disk, and further comprising control means capably of causing said end of said boom segment to move in a circle of any desired diameter, whereby, variable displacement rotary motion is produced thus functioning as a variable displacement motor.

15. The boom assembly as set forth in claim 1, wherein both said extensible means comprises hydraulic cylinders, the boom assembly further including means for pumping fluid, said means comprising a rotatable disk engaging with another end of said second boom segment by means of a pin rotatably and extensibly movable in a bearing connected to said another end of said second boom segment by means of a universal joint, said pin being movable within a radial slot in said rotatably disk, and further comprising control means capable of positioning said pin in any desired offset position in said slot, whereby, upon rotation of said dish, said hydraulic cylinders are pumped at variable stroke lengths, dependent on the position of said pin, thereby functioning as a variable displacement pump.

* * * * *

UNITED STATES PATENT AND TRADEMARK OFFICE
CERTIFICATE OF CORRECTION

PATENT NO. : 5,060,532
DATED : October 29, 1991
INVENTOR(S) : Sidney L. Barker

It is certified that error appears in the above—identified patent and that said Letters Patent is hereby corrected as shown below:

In Column 3, line 43, please delete "dr" and insert therefor --drawings--.

In Column 3, line 58, please delete "assemble" and insert therefor --assembly--.

In Column 6, line 33, please delete "43'" and insert therefor --32'--.

In Column 8, line 35, please delete "Y°" and insert therefor --Y'--.

In Column 9, line 10, please delete "rotatably" and insert therefor --rotatable--.

In Column 9, line 11, please delete "capably" and insert therefor --capable--.

In Column 10, line 12, please delete "dish" and insert therefor --disk--.

Signed and Sealed this

Twenty-third Day of November, 1993

Attest:

BRUCE LEHMAN

Attesting Officer

Commissioner of Patents and Trademarks